(12) United States Patent
Huchet et al.

(10) Patent No.: US 12,305,593 B2
(45) Date of Patent: May 20, 2025

(54) FAN MODULE IMPELLER, AND JET TURBINE ENGINE EQUIPPED WITH SUCH AN IMPELLER

(71) Applicant: SAFRAN AIRCRAFT ENGINES, Paris (FR)

(72) Inventors: Sylvain Huchet, Moissy-cramayel (FR); Didier Queant, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/573,835

(22) PCT Filed: Jun. 20, 2022

(86) PCT No.: PCT/FR2022/051190
§ 371 (c)(1),
(2) Date: Dec. 22, 2023

(87) PCT Pub. No.: WO2022/269180
PCT Pub. Date: Dec. 29, 2022

(65) Prior Publication Data
US 2024/0337229 A1 Oct. 10, 2024

(30) Foreign Application Priority Data
Jun. 23, 2021 (FR) ...................... 2106662

(51) Int. Cl.
*F02K 7/00* (2006.01)
*B64C 11/06* (2006.01)
(Continued)

(52) U.S. Cl.
CPC .............. *F02K 7/005* (2013.01); *B64C 11/06* (2013.01); *F01D 7/00* (2013.01); *F01D 17/162* (2013.01); *F02K 3/06* (2013.01); *F05D 2260/74* (2013.01)

(58) Field of Classification Search
CPC .... F02K 7/005; F02K 3/06; F01D 5/30–3046; F01D 5/147; F01D 2220/36;
(Continued)

(56) References Cited

U.S. PATENT DOCUMENTS 5,263,898 A * 11/1993 Elston, III .............. B64C 11/06
416/129
2013/0287562 A1* 10/2013 Ishigure .................... F02K 3/06
415/208.1
2019/0368376 A1* 12/2019 De Spiegeleer ...... F01D 21/045

FOREIGN PATENT DOCUMENTS

| EP | 2674577 A2 | 12/2013 |
| EP | 2706240 A2 | 3/2014 |
| EP | 3798418 A1 | 3/2021 |

OTHER PUBLICATIONS

Search Report and Written Opinion issued in PCT/FR2022/051190, mailed on Nov. 15, 2022.
(Continued)

*Primary Examiner* — Loren C Edwards
(74) *Attorney, Agent, or Firm* — Bookoff McAndrews, PLLC (57) ABSTRACT

Turbojet engine fan module wheel, including a plurality of blades made of composite material, each blade having a root assembled with a base distinct from the bases of the other blades, each base having a groove extending axially and opening out on the side of the upstream face and on the side of the downstream face, each root cooperating by axial interlocking in a form-fitting manner, for example in the shape of a dovetail, with the groove of the base, whereby the root is retained on the base along the radial and circumferential directions, and each base cooperates with at least one part configured to axially block the root within the groove of the base, whereby the root is retained along the axial direction.

11 Claims, 6 Drawing Sheets

(51) Int. Cl.
  *F01D 7/00*  (2006.01)
  *F01D 17/16*  (2006.01)
  *F02K 3/06*  (2006.01)
(58) Field of Classification Search
  CPC .... F01D 2240/80; F01D 2260/30; F01D 5/12;
       F01D 5/14; F01D 7/00; F01D 17/162;
       F04D 29/322; F04D 29/323; F05D
       2220/36; F05D 2240/80; F05D 2260/30;
       F05D 2260/74; B64C 11/06
  See application file for complete search history.

(56) References Cited

OTHER PUBLICATIONS

Search Report issued in French Application No. 2106662, mailed Mar. 11, 2022.

\* cited by examiner

FAN MODULE IMPELLER, AND JET TURBINE ENGINE EQUIPPED WITH SUCH AN IMPELLER

CROSS-REFERENCE TO RELATED APPLICATIONS

This is a National Stage Application under 35 U.S.C. § 371 of International Application No. PCT/FR2022/051190, filed Jun. 20, 2022, now published WO 2022/269180 A1, which claims priority to French Patent Application No. 2106662, filed on Jun. 23, 2021.

TECHNICAL FIELD

The present disclosure relates a fan module wheel for a turbojet engine and, more particularly, a fan module outlet rectifier wheel, and a turbojet engine equipped with such a wheel. A fan module outlet rectifier wheel is also known to those skilled in the art by the term Outlet Guide Vane or the acronym OGV. Such a wheel is fixed, and therefore does not rotate about the axis of the turbojet engine unlike a fan wheel.

It will be noted that the term "turbojet engine" designates a gas turbine apparatus providing, by reaction to the high-speed ejection of hot gases, a thrust necessary for propulsion.

PRIOR ART

The blades of the known fan module outlet rectifier wheels can be made of fiber-reinforced organic-matrix composite material. The assembly of such blades with the rest of the wheel generally uses at least one bolt directly taken from a portion of the blade, for example the root and/or the tip of the blade, and is generally not optimized in terms of resistance to vibrations or to impact. Moreover, the formation of assembly holes in the composite material weakens the blade with local stress concentrations that are sometimes very harmful. There is therefore a need in this sense. Moreover, a similar need was also observed with the fan blades of a turbojet engine fan module.

DISCLOSURE OF THE INVENTION

One embodiment relates to a turbojet engine fan module wheel, having an axial direction, a radial direction and a circumferential direction, an upstream face and a downstream face, the wheel comprising a plurality of blades made of fiber-reinforced organic-matrix composite material, each blade having a root assembled with a base distinct from the bases of the other blades, each base having a groove extending axially and opening out on the side of the upstream face and/or on the side of the downstream face, each root cooperating by axial interlocking in a form-fitting manner, for example in the shape of a dovetail, with the groove of the base, whereby the root is retained on the base along the radial and circumferential directions, and each base cooperates with at least one part configured to axially block the root within the groove of the base, whereby the root is retained along the axial direction.

Generally speaking, the axial direction corresponds to the direction of the axis of the rectifier wheel, and a radial direction is a direction perpendicular to the axial direction. The circumferential (or azimuthal) direction corresponds to the direction describing a ring around the axial direction. The three axial, radial and circumferential directions correspond respectively to the directions defined by the position, the radius and the angle in a cylindrical coordinate system. Furthermore, the upstream and the downstream are defined in relation to the normal flow direction of the fluid (from upstream to downstream) through the rectifier wheel (and more generally through the turbojet engine).

It is understood that each blade is assembled with a base of its own. In other words, there are as many bases as there are blades, each base receiving a single blade (distinct from the blades of the other bases). In other words, there is one base per blade. Also, subsequently and unless otherwise specified, the description aiming all or part of the system for assembling a blade (e.g. a blade, a base and at least one part configured to axially block the root) applies to all or part, respectively, of each of the systems for assembling all the other blades.

The root and the groove can have any shape allowing axial interlocking in a form-fitting manner, for example in the shape of a dovetail, a clover, etc. The groove can axially open out only on the side of the upstream face (i.e. be axially closed on the side of the downstream face), only on the side of the downstream face (i.e. be axially closed on the side of the upstream face), or axially open out on the side of the upstream face and on the side of the downstream face. This last configuration has the advantage of facilitating the assembly of the root with the groove (several fitting directions being possible).

The base can cooperate with one, two, or more than two part(s) configured to axially block the root within the groove of the base. This or these parts can be specific to each blade, or be common to two, more than two, or all the blades.

Such an assembly system makes it possible to obtain better resistance to vibrations and better bending stiffness. Moreover, such an assembly does not comprise any drilling in the blade, which avoids weakening it. This also makes it possible to reduce the mass of the assembly by omitting the blade fixing bolts of the state of the art. The reduced number of parts required for the assembly also makes it possible to meet the constraint of reduction of the mass. For example, the system for assembling each blade comprises only three elements, namely the blade, the base and a single part configured to axially block the root within the groove of the base.

In some embodiments, the blades are variable pitch blades, each of the bases being mounted on a single part, distinct from the single parts of the other bases, configured to axially block the root within the groove of the base, each single part being configured to pivot around the radial direction.

It is understood that each base cooperates with a single part configured to axially block the root within the groove of its own. In other words, there are as many single parts as there are bases, each single part cooperating with a single base (distinct from the bases of the other single parts). In other words, there is a single part per base. The single part allows on the one hand to axially block the root within the groove, and on the other hand to pivot the base, and therefore the blade, around the radial direction, whereby the pitch (i.e. the angle that a chord of the blade forms with the incident air stream) of the blade is variable. The single part can pivot around the radial direction by any means otherwise known to those skilled in the art.

In some embodiments, each single part comprises a cavity receiving at least one piece of the base, the walls of the cavity clogging the groove on the side of the upstream face and on the side of the downstream face.

The single part therefore blocks the root axially within the groove in the two opposite directions, namely from upstream to downstream and from downstream to upstream.

In some embodiments, each base comprises a flange extending along the axial and circumferential directions, the base being fixed to the single part via the flange.

For example, the flange is an annular flange extending in a plane defined by the axial and circumferential directions. For example, the flange has through holes extending along the radial direction, for example counterbored holes, for fixing the flange using screws. Such a structure makes it possible to form a wall that is as continuous and smooth as possible, avoiding or limiting, in operation, the formation of aerodynamic drag in the air stream.

In some embodiments, the blades are fixed pitch blades, each base cooperating with an upstream part configured to axially block the root within the groove of the base towards the side of the upstream face and a downstream part configured to axially block the root within the groove of the base towards the side of the downstream face.

The upstream part allows blocking the blade along the axial direction, from downstream to upstream. The downstream part allows blocking the blade along the axial direction, from upstream to downstream.

For example, the upstream part and the downstream part can be specific to each blade or common to several blades. For example, the upstream part and the downstream part can be portions of the wheel casing or flanges of the wheel hub. The upstream and downstream parts can be fixed to the base(s), but not necessarily. The bases are stationary relative to the rest of the wheel, thanks to which the blades are fixed (i.e. cannot rotate around a radial direction).

In some embodiments, the root of each blade and the groove of each base have the same axial length.

This ensures immediate contact between the root of each blade and the part(s) configured to axially block the root within the groove of the base. This reduces the number of parts required and the mass while improving resistance to vibrations and bending stiffness.

In some embodiments, the turbojet engine fan module wheel as briefly discussed above is a turbojet engine fan module outlet rectifier wheel. The blades of the rectifier wheel are called rectifier blades.

In some embodiments where the wheel is a turbojet engine fan module outlet rectifier wheel, the blades are fixed pitch blades and each blade has a tip assembled with a second base distinct from the second bases of the other blades, each second base having a groove extending axially and opening out on the side of the upstream face and/or on the side of the downstream face, each tip cooperating by axial interlocking in a form-fitting manner, for example in the shape of a dovetail, with the groove of the second base, whereby the tip is retained on the second base along the radial and circumferential directions, and each second base cooperates with at least one second part configured to axially block the tip within the groove of the second base, whereby the tip is retained along the axial direction.

In other words, when the blades are fixed pitch blades, they can further be held by the tip using a system similar to the system holding them by the root. The groove of each second base can axially open out only on the side of the upstream face (i.e. be axially closed on the side of the downstream face), only on the side of the downstream face (i.e. be axially closed on the side of the upstream face), or open out axially on the side of the upstream face and on the side of the downstream face. This latter configuration has the advantage of facilitating the assembly of the tip with the second groove (several fitting directions being possible). For example, the groove of the base and the groove of the second base can both open out on one and the same side, but not necessarily.

In some embodiments, each second base cooperates with a second upstream part configured to axially block the tip within the groove of the second base towards the side of the upstream face and a second downstream part configured to axially block the tip within the groove of the second base towards the side of the downstream face.

The second upstream part allows blocking the blade along the axial direction, from downstream to upstream. The second downstream part allows blocking the blade along the axial direction, from upstream to downstream.

For example, the second upstream part and the second downstream part can be specific to each blade or common to several blades. For example, the second upstream part and the second downstream part can be portions of the wheel casing. The second upstream and downstream parts can be fixed to the second base(s), but not necessarily.

In some embodiments, the tip of each blade and the groove of each second base have the same axial length.

This ensures immediate contact between the tip of each blade and the second part(s) configured to axially block the tip within the groove of the second base. This reduces the number of parts required and the mass while improving resistance to vibrations and bending stiffness.

In some embodiments, the turbojet engine fan module wheel as briefly discussed above is a turbojet engine fan wheel.

One embodiment relates to a turbojet engine comprising a turbojet engine fan module wheel according to any one of the embodiments described in the present disclosure.

BRIEF DESCRIPTION OF THE DRAWINGS

The object of the present disclosure and its advantages will be better understood upon reading the detailed description given below of different embodiments given as non-limiting examples. This description refers to the pages of the appended figures, on which.

DESCRIPTION OF THE EMBODIMENTS

Figure 1:
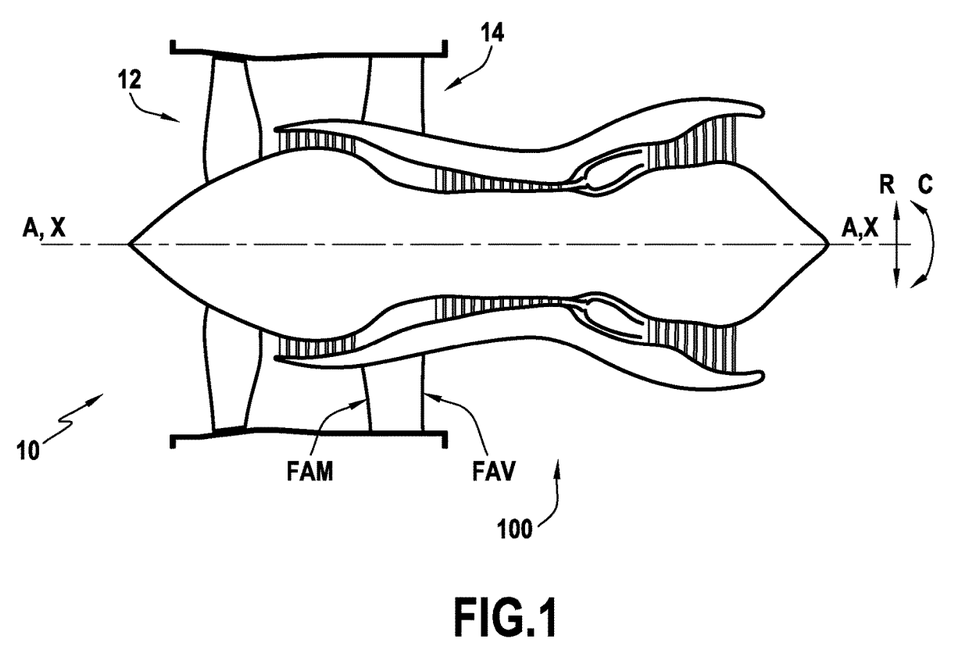
FIG. 1 represents a partial sectional view of a turbojet engine.

FIG. 1 schematically represents a turbojet engine 100 comprising a fan module 10. In this example, the turbojet engine 100 is of the twin spool turbofan type, but any other type of turbojet engine comprising a fan module can be envisaged.

The fan module 10 has a fan 12 and an outlet rectifier wheel 14. The fan 12 rotates about the axis A while the rectifier wheel 14 does not rotate about the axis A. The axis A corresponds to the axis of the turbojet engine 100, which is coincident with the axis of the fan 12 and the axis of the rectifier wheel 14, and defines the axial direction X. The wheel 14 has an axial direction X, a radial direction R, a circumferential direction C, an upstream face FAM and a downstream face FAV.

Figure 2:
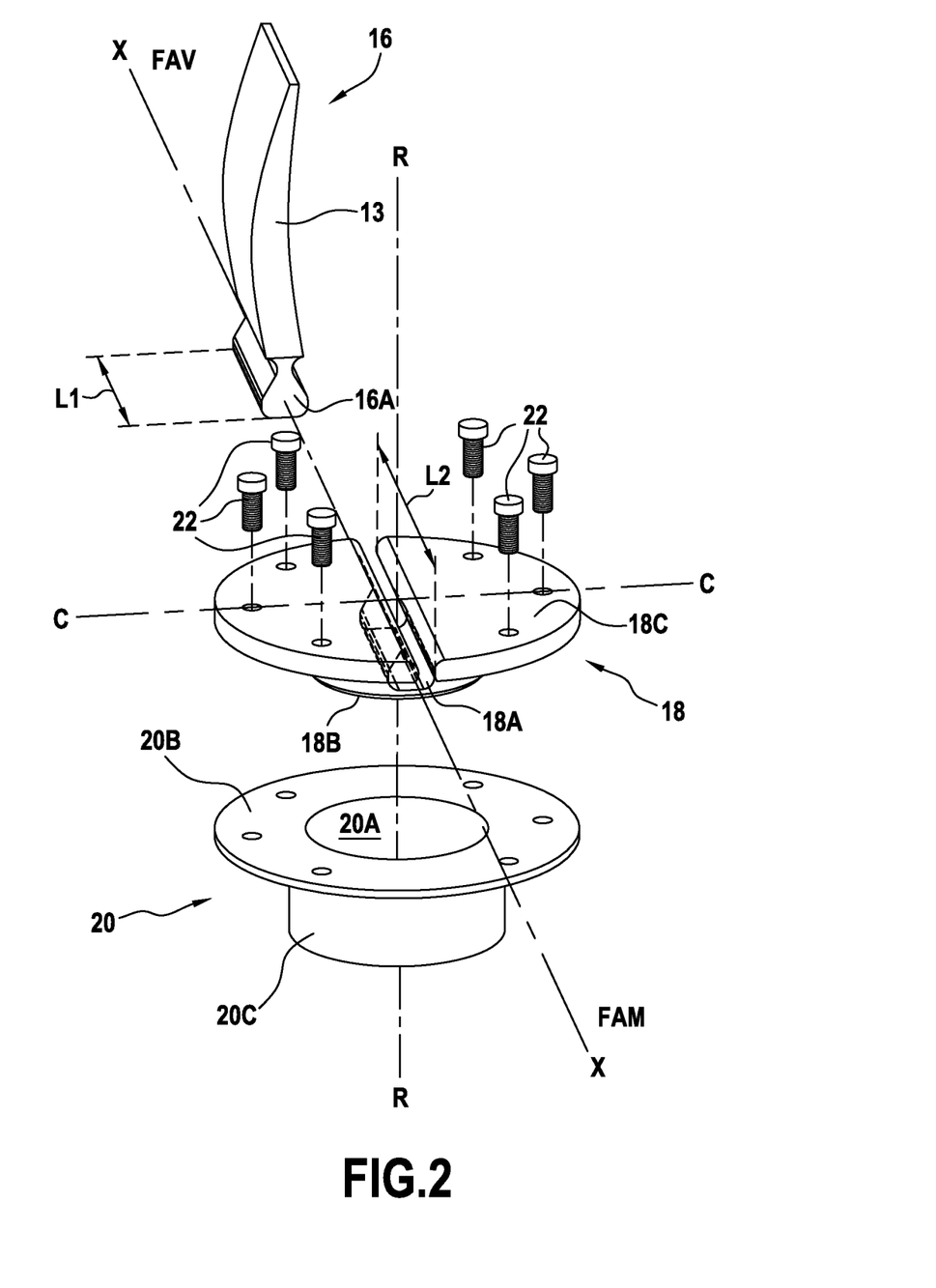
FIG. 2 represents an exploded view of a system for assembling a blade of a fan module wheel for the turbojet engine of FIG. 1, for the case of a variable pitch blade.

FIG. 2 represents the system for mounting a blade within a first embodiment of the outlet rectifier wheel 14, within which the blades 16 are variable pitch blades. It is however noted that the blade mounting system of FIG. 2 can also be applied to the blades of the fan 12 wheel of FIG. 1. FIG. 2 represents a single rectifier blade 16, but this system is the same for all rectifier blades 16 of the wheel 14 according to the first embodiment. It is noted that the aerodynamic profile 13 of the blade 16 represented in FIG. 2 is purely schematic, and does not correspond to an actual profile.

The blades 16 are made of fiber-reinforced organic-matrix composite material, for example carbon fibers woven following a three-dimensional weaving. Each blade 16 has a root 16A assembled with a base 18 distinct from the bases of the other blades of the wheel 14. The base 18 has a groove 18A extending axially and opening out on the side of the upstream face FAM and on the side of the downstream face FAV. The root 16A cooperates by axial interlocking in a form-fitting manner with the groove 18A of the base 18 (form-fitting between the outer surface of the root 16A and the inner surface of the groove 8A). In this example, the root 16A and the groove 18A have a section transverse to the interlocking direction (i.e. to the axial direction X) in the shape of a dovetail (however, other complementary shapes not represented can be envisaged here). This allows the root 16A to be retained within the base 18 along the radial R and circumferential C directions. In this example, the base 18 cooperates with a single part 20 configured to axially block the root 16A within the groove 18A of the base 18. This allows the root 16A to be retained along the axial direction X within the groove 18a. Particularly, the single part 20 blocks the root 16A in the direction of the upstream face FAM towards the downstream face FAV and in the direction of the downstream face FAV towards the upstream face FAM. The single part 20 (pivot part) is configured to pivot around the radial direction R, by any means otherwise known to those skilled in the art, whereby the pitch of the blade is variable.

The single part 20 comprises a cavity 20A receiving at least one piece 18B of the base 18, the walls of the part which delimit the cavity 20A clogging the groove 18A on the side of the upstream face FAM and on the side of the downstream face FAV. The axial length L1 of the root 16A is equal to the axial length L2 of the groove 18A. It will be noted that the root 16A of the blade has, at its two opposite axial ends, two faces called upstream and downstream faces whose surfaces are shaped so as to be locally complementary to the inner surface of the walls of the part 20 which define the cavity 20A, and in particular at the place where these walls axially obstruct the groove.

More particularly, in this example, the piece 18B of the base 18 has a cylindrical shape with an axis parallel to the radial direction R, in which the groove 18A is arranged. The groove 18A opens out and passes right through the piece 18B, perpendicularly to the axis of the cylindrical shape. The cavity 20A of the single part 20 also has a cylindrical shape, adjusted to the piece 18B, so as to be able to fit the piece 18B into the cavity 20B with a minimum clearance. For example, the surfaces of the two upstream and downstream faces of the root 16A are cylindrical (radiated) and these cylindrical surfaces are concentric with the cylindrical shape of the cavity 20A of the part 20 and of the same radius. The base 18 further has an annular flange or collar 18C extending along the axial X and circumferential C directions, the base 18 being fixed to the single part 20 via this flange 18C. The annular flange 18C is more particularly separated into two pieces by a central axial slot located in line with the groove 18A and which opens out into it. In this example, the single part 20 also has an annular flange or collar 20B configured to cooperate with the flange 18C. For example, the base 18 is fixed to the single part 20 using screws 22. For example, the cavity 20A is arranged in a cylindrical portion 20C with an axis parallel to the radial direction R.

Figure 3:
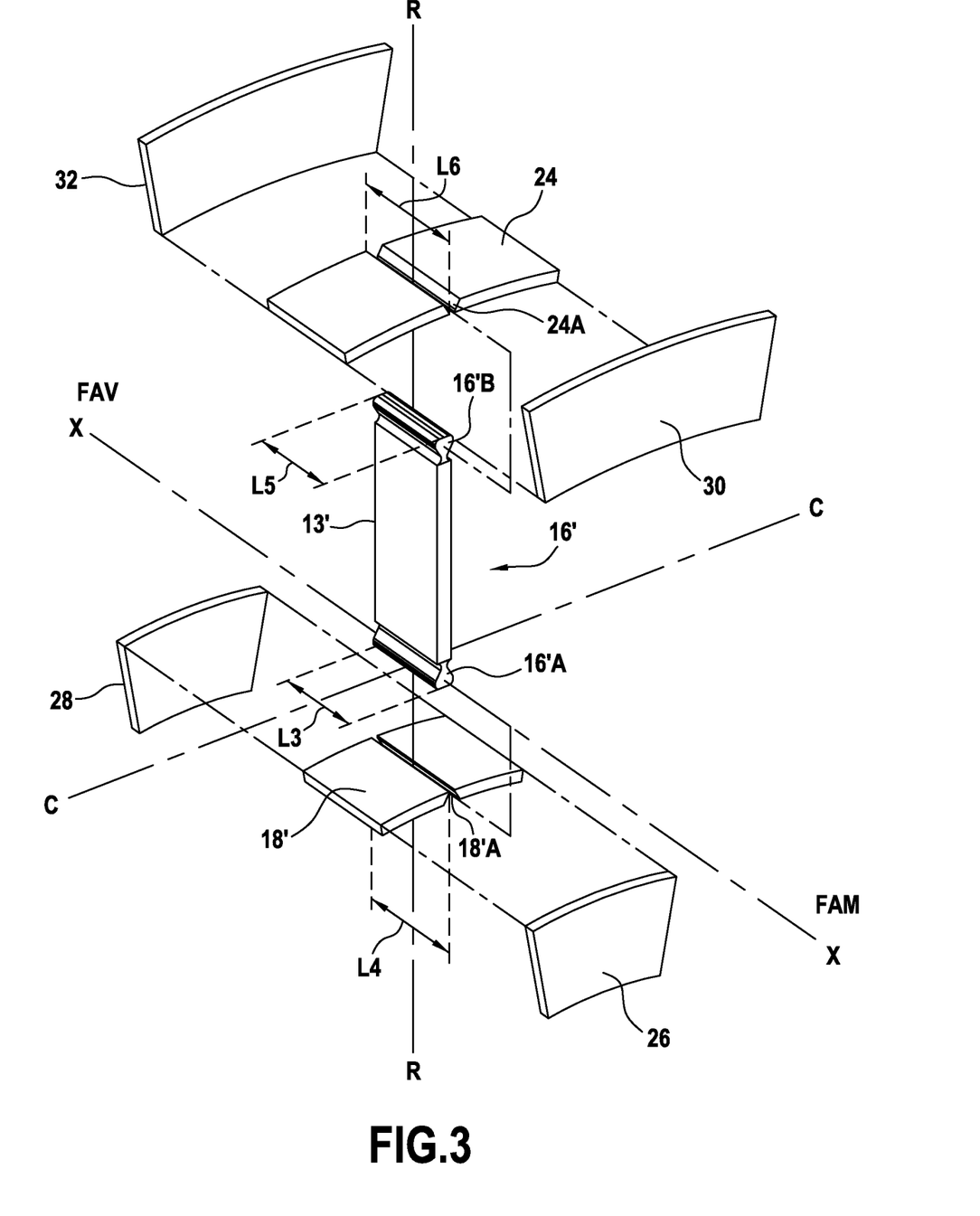
FIG. 3 represents an exploded view of the system for assembling a blade of a fan module outlet rectifier wheel for the turbojet engine of FIG. 1, for the case of a fixed pitch blade.

FIG. 3 represents the system for mounting a blade within a second embodiment of the outlet rectifier wheel 14, within which the blades 16' are fixed pitch blades. FIG. 3 represents a single rectifier blade 16', but this system is the same for all the rectifier blades 16' of the wheel 14 according to the second embodiment. It is noted that the aerodynamic profile 13' of the blade 16' represented in FIG. 3 is purely schematic, and does not correspond to an actual profile.

The blades 16' are made of fiber-reinforced organic-matrix composite material. Each blade 16' has a root 16'A assembled with a base (or first base) 18' distinct from the bases of the other blades of the wheel 14 and a tip 16'B assembled with a second base 24 distinct from the second bases of the other blades of the wheel 14.

The base 18' has a groove 18'A extending axially and opening out on the side of the upstream face FAM and on the side of the downstream face FAV. The root 16'A cooperates by axial interlocking in a form-fitting manner with the groove 18'A of the base 18'. In this example, the root 16'A and the groove 18'A have a section transverse to the inter-locking direction (i.e. to the axial direction X) in the shape of a dovetail (however, other complementary shapes not represented can be envisaged here). This allows the root 16'A to be retained within the base 18' along the radial R and circumferential C directions. The axial length L3 of the root 16'A is equal to the axial length L4 of the groove 18'A. For example, the base 18' has a substantially parallelepiped shape, and can be formed of two distinct parts as represented in FIG. 3, or of one and the same part.

In this example, the base 18' cooperates with an upstream part 26 configured to axially block the root 16'A within the groove 18'A of the base 18' along the axial direction in the direction oriented from the downstream face FAV towards the side of the upstream face FAM. The base 18' also cooperates with a downstream part 28 configured to axially block the root 16'A within the groove 18'A of the base 18' along the axial direction in the direction oriented from the upstream face FAM towards the side of the downstream face FAV. This allows the root 16'A to be retained along the axial direction X within the groove 18'A. In this example, the upstream part 26 and the downstream part 28 are specific to the blade 16', i.e. there are as many upstream part 26 and second downstream part 28 as there are blades 16'. In this example, the upstream part 26 and the downstream part 28 are portions of the wheel 14 casing.

The second base 24 has a groove 24A extending axially and opening out on the side of the upstream face FAM and on the side of the downstream face FAV. The tip 16'B cooperates by axial interlocking in a form-fitting manner with the groove 24A of the second base 24. In this example, the tip 16'B and the groove 24A have a section transverse to the interlocking direction (i.e. axial direction X) in the shape of a dovetail. This allows the tip 16'B to be retained within the second base 24 along the radial R and circumferential C directions. The axial length L5 of the tip 16'B is equal to the axial length L6 of the groove 24A. For example, the second base 24 has a substantially parallelepiped shape, and can be formed of two distinct parts as represented in FIG. 3, or of one and the same part.

In this example, the second base 24 cooperates with a second upstream part 30 configured to axially block the tip 16'B within the groove 24A of the second base 24 along the axial direction in the direction oriented from the downstream face FAV towards the side of the upstream face FAM. The second base 24 also cooperates with a second downstream part 32 configured to axially block the tip 16'B within the groove 24A of the base 24 along the axial direction in the direction oriented from the upstream face FAM towards the side of the downstream face FAV. This allows the tip 16'B to be retained along the axial direction X within the groove 24A. In this example, the second upstream part 30 and the second downstream part 32 are specific to the blade 16', i.e. there are as many second upstream part 30 and second downstream part 32 as there are blades 16'. In this example, the second upstream part 30 and the second downstream part 32 are portions of the wheel 14 casing.

Figure 4:
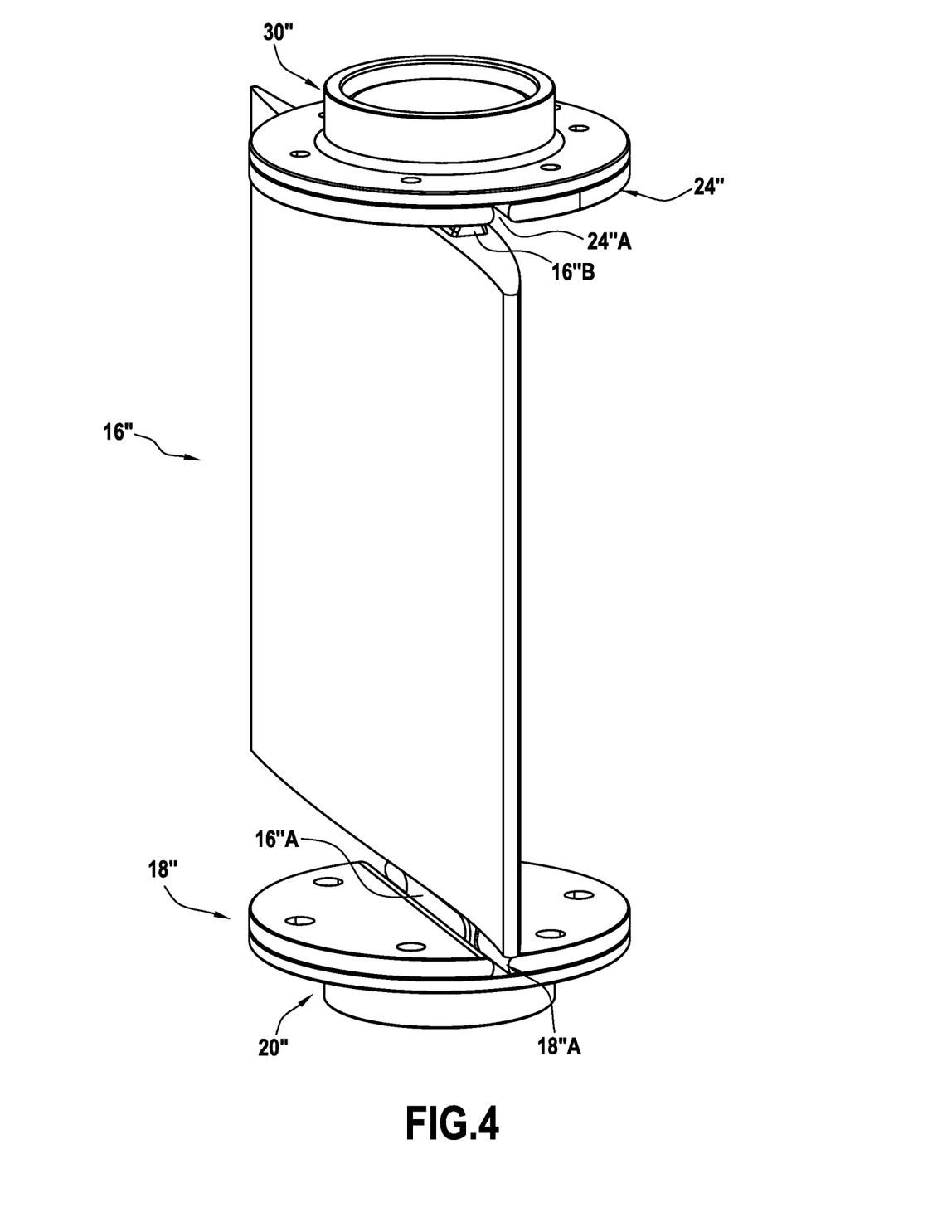
FIG. 4 represents a view of another system for assembling a blade of a fan module outlet rectifier wheel for the turbojet engine of FIG. 1.
Figure 5:
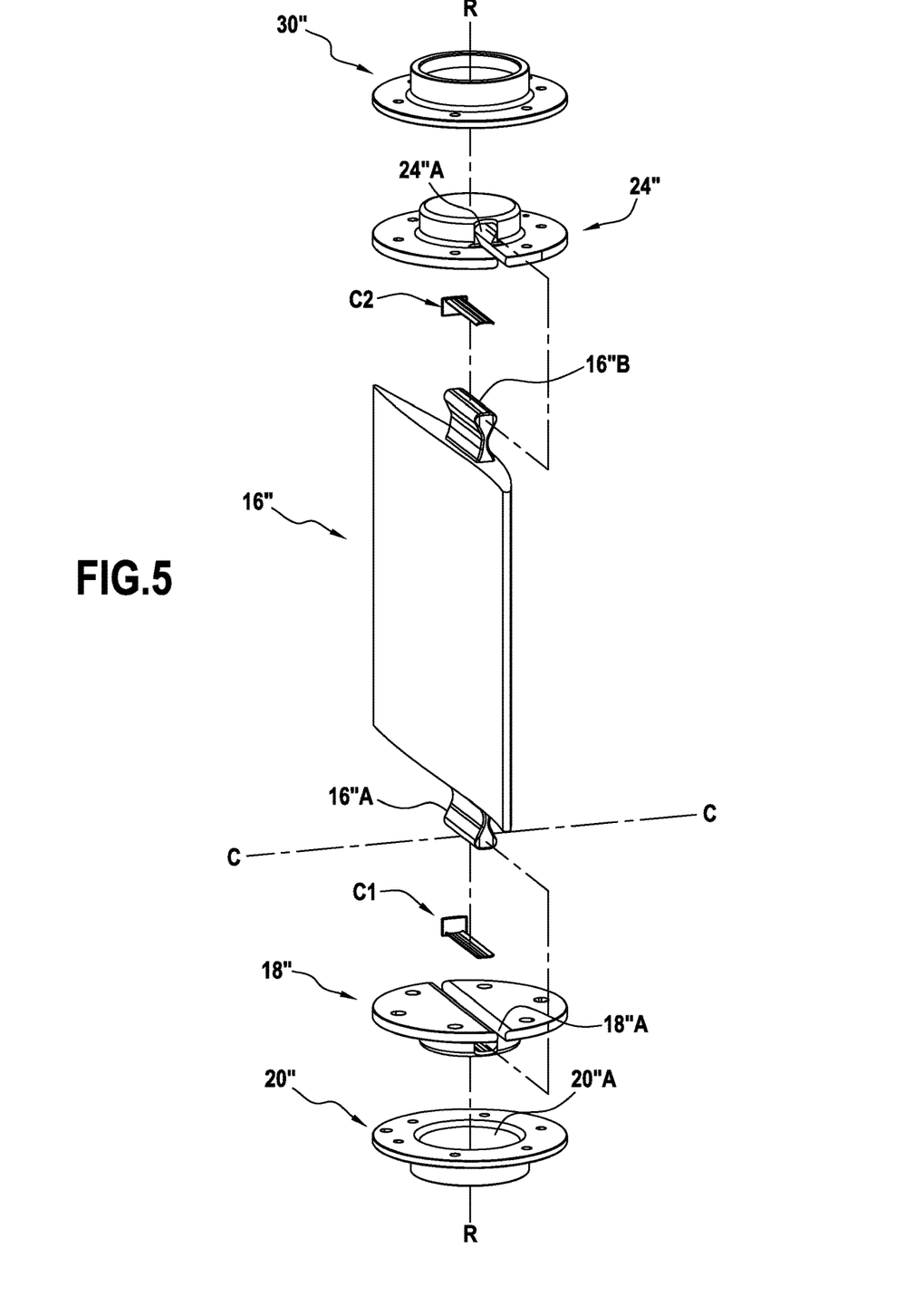
FIG. 5 represents an exploded view of the assembly system of FIG. 4.
Figure 6:
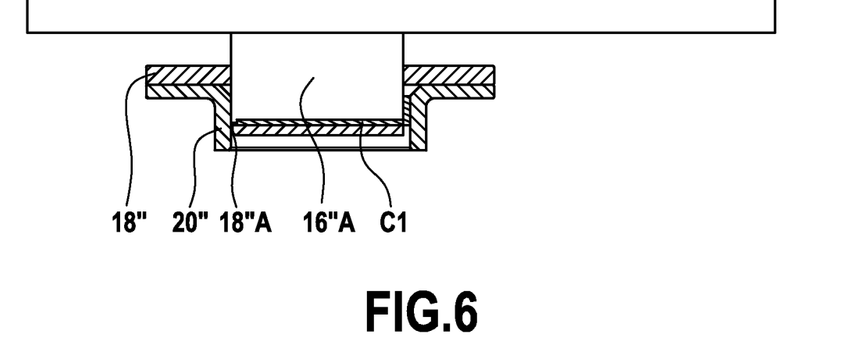
FIG. 6 represents an enlarged partial view showing the position of a shim between a blade root and the groove of a base.

FIGS. 4 to 6 illustrate one embodiment which repeats that of FIG. 2 and which adds a similar blocking for the tip of the blade with elements similar or identical to those described for the root of the blade. Thus, in FIG. 4, the root 16"A of the blade 16" is radially and circumferentially retained in the groove 18"A of the base 18" and the root is axially blocked thanks to the blocking part 20" (pivot part). Likewise, the tip 16"B of the blade 16" is radially and circumferentially retained in the groove 24"A of the second base 24" and the root 16"B is axially blocked thanks to the second blocking part 30" (pivot part).

FIG. 5 which is an exploded view of the assembled system of FIG. 4 shows the different constituent elements of this system including two (optional) shims C1, C2 which are each represented between the bottom of the groove of the corresponding base 18" and 24" and the underside or bottom of the blade root or the top of the blade tip. These shims are used in particular to wedge in position the blade root (blade tip) in the axial groove of the base, to facilitate the dismounting and also serve as a wear part. It will be noted that the blocking parts (pivot parts) illustrated in FIGS. 4 and 5 have been represented with a bottom. However, in one variant not represented, a bottom is not necessarily present, which makes it possible to reduce the weight of the part and of the assembly integrating this part. The same applies to the part 20 of FIG. 2 which may or may not have a bottom.

Generally speaking, a shim can be inserted into the groove under the bottom of the blade root, in order to facilitate the assembly of the blade with the base and to maintain a constant contact pressure between the blade root and the groove. This shim preferably has a slightly curved shape ("banana" shape) following its axial extension (along its longitudinal axis) allowing this contact pressure to be exerted once said shim is inserted into the groove (due to its elastic deformation). The shim can have a general L shape as illustrated in FIG. 5, to come into contact with the cavity of the base (ex: 20"A) on only one side of the groove (in FIG. 5 the shim is curved transversely and not longitudinally as for a "banana" shape but such a curvature also allows a mounting by stressing through elastic deformation).

FIG. 6 illustrates, in an axial sectional view along the groove, the shim C1 in position interposed between the blade root 16"A and the groove 18"A of the base 18" interlocked into the axial blocking part 20". Thanks to this mounting, the shim exerts an axial pressure making it possible to axially retain the root. In addition, the shim exerts a radial pressure of the root on the groove to ensure caulking pressure between these parts. The same arrangement also applies to the shim C2 of FIG. 5. The shim can have a general shape curved along its length in the shape of a "banana", a general shape curved like a tile along its transverse direction or a rectilinear L shape, or a combination of several of these shapes.

Figure 7:
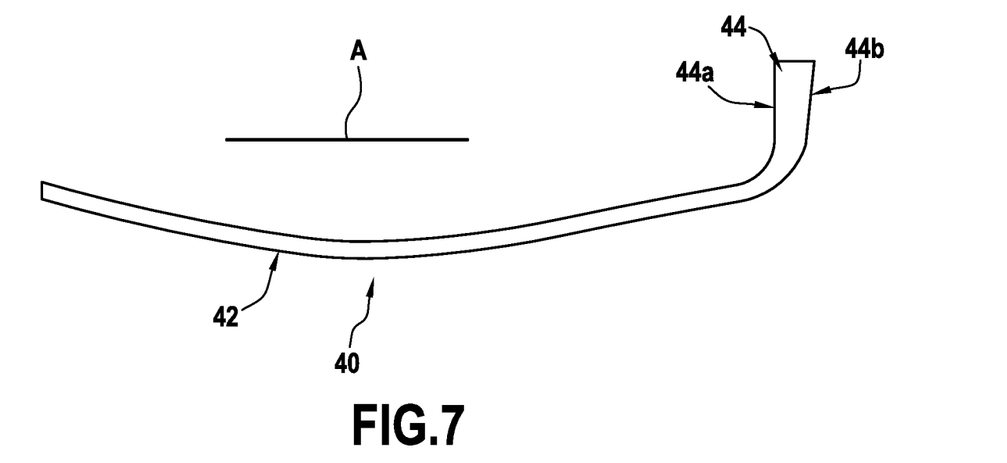
FIG. 7 represents a possible embodiment of a shim that can be used in the systems of FIGS. 2 to 6.

FIG. 7 illustrates the shape of a shim 40 combining a first piece 42 of curved longitudinal shape in the shape of a "banana" and a second piece 44 forming a return substantially perpendicular to the first piece 42 and which gives the whole a general shape of L. It will be noted that the return 44 has a first face 44a substantially perpendicular to the general direction of longitudinal extension A of the first piece 42 and a second opposite face which is convex in order to axially retain the root of the blade (a contact pressure between the cavity 20"A in FIG. 5 and the root 16"A of the blade is thus ensured), while allowing the mounting.

The preceding description concerning the shims can also apply to the embodiment of FIGS. 2 and 3.

Although the present invention has been described with reference to specific embodiments, it is obvious that modifications and changes can be made to these examples without departing from the general scope of the invention as defined by the claims. Particularly, individual characteristics of the different illustrated/mentioned embodiments can be combined in additional embodiments. Therefore, the description and drawings should be considered in an illustrative rather than a restrictive sense.

The invention claimed is:

1. A turbojet engine fan module wheel, having an axial direction, a radial direction and a circumferential direction, an upstream face and a downstream face, the wheel comprising a plurality of blades made of fiber-reinforced organic-matrix composite material, each blade of the plurality of blades having a root assembled with a base distinct from the bases of the other blades of the plurality of blades, each of the respective bases having a groove extending axially and opening out on a side of the upstream face and/or on a side of the downstream face, each of the respective roots cooperating by axial interlocking in a form-fitting manner, optionally in a shape of a dovetail, with the respective grooves of the respective bases, whereby the respective root is retained on the respective base along the radial direction and the circumferential direction, and each of the respective bases cooperates with at least one part configured to axially block the respective root within the respective groove of the respective base, whereby the respective root is retained along the axial direction, wherein the plurality of blades are variable pitch blades, each of the respective bases being mounted on the at least one part configured to axially block the respective root within the respective groove of the respective base, wherein the at least one part is a single part distinct from the single parts of the other bases, each of the at least one part being configured to pivot around the radial direction, wherein each root of the plurality of blades and each of the respective grooves extend along the radial direction of the plurality of blades and the fan module wheel, each of the single parts comprises an annular collar which is fixed to a corresponding annular flange of each of the respective bases using fasteners extending longitudinally in the radial direction.

2. The turbojet engine fan module wheel according to claim 1, wherein each of the single parts comprises a cavity receiving at least one piece of the respective base, the walls of the cavity blocking the respective groove on the side of the upstream face and on the side of the downstream face, whereby the respective root is retained along the axial direction.

3. The turbojet engine fan module wheel according to claim 1, wherein each of the respective flanges extend along the axial direction and the circumferential direction.

4. The turbojet engine fan module wheel according to claim 3, wherein each of the annular flanges is separated into two pieces by a central axial slot located in line with the groove, wherein the groove opens out into the central axial slot.

5. The turbojet engine fan module wheel according to claim 1, wherein the root of each of the respective blades and the groove of each of the respective bases have a same axial length.

6. The turbojet engine fan module wheel according to claim 1, wherein the wheel is a turbojet engine fan wheel.

7. A turbojet engine comprising the turbojet engine fan module wheel according to claim 1.

8. The turbojet engine fan module wheel according to claim 1, wherein each blade of the plurality of blades comprises a single base.

9. The turbojet engine fan module wheel according to claim 1, wherein the at least one part is common between each of the blades of the plurality of blades.

10. The turbojet engine fan module wheel according to claim 1, wherein a tip of each blade comprises at least one second part identical to the at least one part.

11. The turbojet engine fan module wheel according to claim 1, further comprising a shim between a bottom of the groove and a tip of each blade, wherein the shim has a curved banana shape, a shape curved like a tile along a transverse direction or a rectilinear L shape, or a combination of shapes, wherein the shim is interposed between the root of each blade and the groove without modifying a structure of each of the blades.

* * * * *